(12) United States Patent
Hirano et al.

(10) Patent No.: US 10,625,349 B2
(45) Date of Patent: *Apr. 21, 2020

(54) CUBIC BORON NITRIDE CUTTING TOOL

(71) Applicant: SUMITOMO ELECTRIC HARDMETAL CORP., Itami-shi, Hyogo (JP)

(72) Inventors: Tsutomu Hirano, Itami (JP); Katsumi Okamura, Itami (JP); Naoki Watanobe, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,429

(22) Filed: Jul. 3, 2018

(65) Prior Publication Data
US 2018/0311744 A1 Nov. 1, 2018

Related U.S. Application Data

(63) Continuation of application No. 14/432,641, filed as application No. PCT/JP2014/058263 on Mar. 25, 2014, now Pat. No. 10,010,940.

(30) Foreign Application Priority Data

May 10, 2013 (JP) .................................. 2013-100055

(51) Int. Cl.
*B23B 27/14* (2006.01)
*B22F 7/06* (2006.01)
(Continued)

(52) U.S. Cl.
CPC ............ *B23B 27/141* (2013.01); *B22F 7/062* (2013.01); *C22C 26/00* (2013.01);
(Continued)

(58) Field of Classification Search
None
See application file for complete search history.

(56) References Cited

U.S. PATENT DOCUMENTS 7,621,700 B2    11/2009  Jonsson et al.
10,010,940 B2 *  7/2018  Hirano ................. B23B 27/141
(Continued)

FOREIGN PATENT DOCUMENTS

CA    2464639 A1    10/2014
EP    1 932 816 A1   6/2008
(Continued)

OTHER PUBLICATIONS

Jun. 24, 2014 Office Action issued in Japanese Application No. 2013-100055.
(Continued)

*Primary Examiner* — Alan Snyder
(74) *Attorney, Agent, or Firm* — Oliff PLC

(57) ABSTRACT

An object is to prolong the life of a cubic boron nitride cutting tool used for cutting a heat-resistant alloy. A cubic boron nitride cutting tool includes an edge tip made of a sintered cubic boron nitride compact including cubic boron nitride particles; and a base metal that holds the edge tip at a corner portion of the base metal, wherein a cutting edge formed on the edge tip of the tool has a positive rake angle.

7 Claims, 5 Drawing Sheets

(51) Int. Cl.
  *C22C 26/00*  (2006.01)
  *B22F 5/00*  (2006.01)
(52) U.S. Cl.
  CPC ... *B22F 2005/001* (2013.01); *B23B 2200/049* (2013.01); *B23B 2200/0447* (2013.01); *B23B 2200/0471* (2013.01); *B23B 2200/086* (2013.01); *B23B 2200/286* (2013.01); *B23B 2226/125* (2013.01); *C22C 2026/003* (2013.01); *Y10T 407/24* (2015.01)

(56) References Cited

U.S. PATENT DOCUMENTS

| | | |
|---|---|---|
| 2010/0275749 A1 | 11/2010 | Kobayashi |
| 2012/0128438 A1 | 5/2012 | Tanaka et al. |
| 2013/0000213 A1 | 1/2013 | Okamura et al. |
| 2013/0108850 A1 | 5/2013 | Kudo et al. |

FOREIGN PATENT DOCUMENTS

| | | |
|---|---|---|
| EP | 1 950 189 A1 | 7/2008 |
| EP | 2 546 010 A1 | 1/2013 |
| JP | S62-271606 A | 11/1987 |
| JP | H03-109706 U | 11/1991 |
| JP | H08-118113 A | 5/1996 |
| JP | 2001-009606 A | 1/2001 |
| JP | 2011-189421 A | 9/2011 |
| JP | 2013-014002 A | 1/2013 |
| WO | 2007/010670 A1 | 1/2007 |
| WO | 2007/145071 A1 | 12/2007 |
| WO | 2011/111261 A1 | 9/2011 |
| WO | 2012/005275 A1 | 1/2012 |

OTHER PUBLICATIONS

Jun. 24, 2014 International Search Report issued in International Application No. PCT/JP2014/058263.

Oct. 6, 2015 Office Action issued in Japanese Patent Application No. 2015-027211.

Nov. 15, 2016 Extended Search Report issued in European Patent Application No. 14794478.9.

* cited by examiner

CUBIC BORON NITRIDE CUTTING TOOL

This application is a continuation application of U.S. patent application Ser. No. 14/432,641 filed Mar. 31, 2015, which is in turn a U.S. National Stage of International Application No. PCT/JP2014/058263, filed Mar. 25, 2014, which claims the benefit of Japanese Patent Application No. 2013-100055 filed May 10, 2013. The disclosure of the prior applications is hereby incorporated by reference herein in their entirety.

TECHNICAL FIELD

The present invention relates to a cubic boron nitride cutting tool including a cutting edge made of a sintered cubic boron nitride (cBN) compact, more specifically, to a life-prolonged cubic boron nitride cutting tool used for high-speed cutting of a heat-resistant alloy, such as a Ni-base heat-resistant alloy.

BACKGROUND ART

One example of materials hard to cut in the cutting process is a Ni-base heat-resistant alloy. When a cemented carbide tool that has been frequently used in the cutting process of a Ni-base heat-resistant alloy, serving as a workpiece, is used, the cutting speed is restricted to 80 m/min or lower at the fastest in consideration of the strength of the tool, whereby enhancement of the work efficiency is prevented.

Thus, it has been studied to perform cutting at a high speed of 200 m/min or higher using a cubic boron nitride cutting tool including a cutting edge made of a sintered cubic boron nitride compact that has a high hot hardness.

While cubic boron nitride has a higher hardness than cemented carbide, cubic boron nitride has a low toughness. Thus, a lateral cutting edge portion is chipped when the above-described cubic boron nitride cutting tool is used to cut a heat-resistant alloy and the cubic boron nitride cutting tool is insufficient for reliable life sustainability. Although cubic boron nitride has a higher toughness than ceramics, the lack of toughness for cutting a heat-resistant alloy is undeniable.

As illustrated in PTL 1 below, a trial conducted as a measure to address the above problem is to cut a workpiece while the workpiece is softened with the heat (cutting heat) occurring at the edge formed of the sintered cubic boron nitride compact as a result of reduction of the thermal conductivity of the sintered cubic boron nitride compact.

Another measure to toughen the cutting edge is to make the rake angle at the edge negative by forming a negative rake face or by other means. This measure is effective in preventing chipping of a cutting edge made of a brittle material.

CITATION LIST

Patent Literature

PTL 1: Japanese Unexamined Patent Application Publication No. 2011-189421

SUMMARY OF INVENTION

Technical Problem

Cutting edges made of a brittle material having a low toughness are usually subjected to an edge toughening process. The cutting edges subjected to the edge toughening process (such as forming a negative rake face) reduce their sharpness due to the edges being blunted by the toughening process, whereby the cutting edges produce a larger amount of cutting heat.

Thus, blunting the edge has been thought to be effective in prolonging the life of a tool in the case of cutting a workpiece using a cutting edge made of a sintered cubic boron nitride compact while the workpiece is softened by the cutting heat.

This measure, however, did not sufficiently prolong the lives of cubic boron nitride cutting tools.

In view of the circumstances, the present invention aims to prolong the life of a cubic boron nitride cutting tool used for cutting a heat-resistant alloy using a method that has been avoided.

Solution to Problem

To solve the above-described problem, the present invention provides a cubic boron nitride cutting tool that includes an edge tip made of a sintered cubic boron nitride compact having a thermal conductivity within the range of 20 to 70 W/m·K and including cubic boron nitride particles having an average particle diameter within the range of 0.5 µm to 2 µm; and a base metal that holds the edge tip at a corner portion of the base metal, wherein a cutting edge formed on the edge tip of the tool has a positive rake angle.

Advantageous Effects of Invention

In the cubic boron nitride cutting tool according to the present invention, an edge tip is made of a sintered cubic boron nitride compact having a low thermal conductivity and a cutting edge formed on the edge tip has a positive rake angle.

Results of experiment have revealed that the cubic boron nitride cutting tool in which the cutting edge has a positive rake angle has lower lateral-cutting-edge-portion boundary wear (written as VN, below) or flank face wear (or flank wear, written as VB, below) than existing cubic boron nitride cutting tools used for cutting a heat-resistant alloy that have been subjected to an edge toughening process, whereby the life of the cubic boron nitride cutting tool has prolonged compared to the lives of existing tools.

DESCRIPTION OF EMBODIMENTS

Referring now to the attached drawings from FIG. 1 to FIG. 9, cubic boron nitride cutting tools according to embodiments of the present invention are described below. The present invention is not limited to these examples and is described by the scope of claim. The present invention is intended to include equivalents of the scope of claim and all the modifications within the scope of claim.

Figure 1:
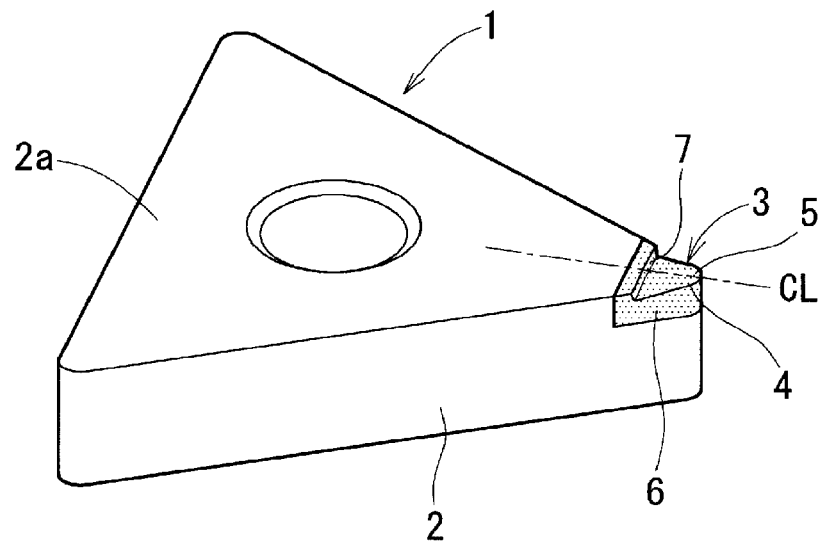
FIG. 1 is a perspective view of an example of a cubic boron nitride cutting tool according to the present invention.
Figure 2:
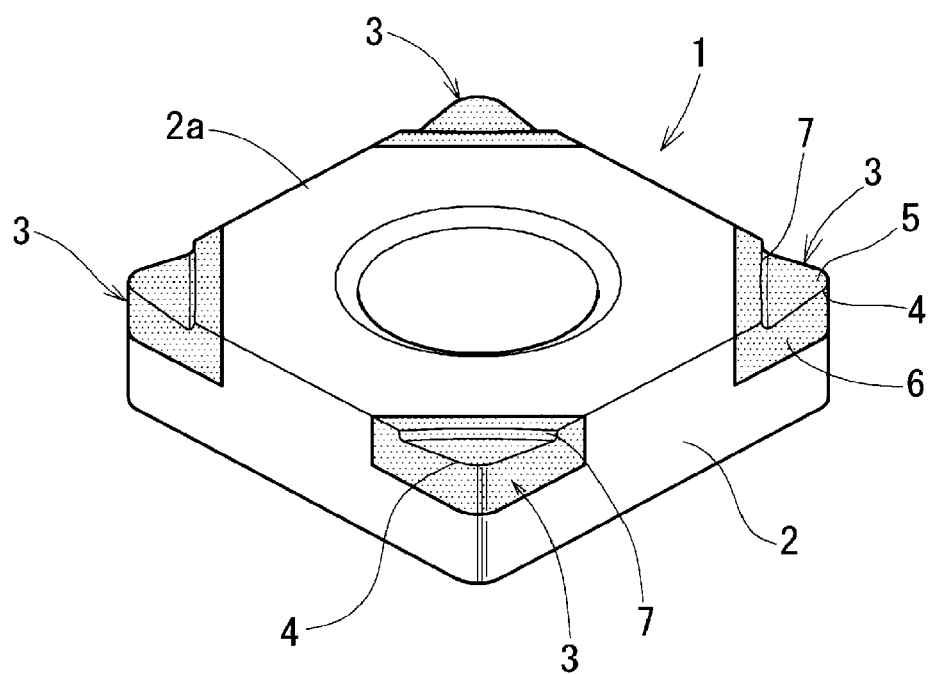
FIG. 2 is a perspective view of another example of a cubic boron nitride cutting tool according to the present invention.

FIG. 1 illustrates an example in which the present invention is applied to a triangular cubic boron nitride cutting insert and FIG. 2 illustrates an example in which the present invention is applied to a square cubic boron nitride cutting insert.

These cubic boron nitride cutting tools (cubic boron nitride cutting inserts) 1 each include an edge tip 3, made of a piece of a sintered cubic boron nitride compact, joined at a corner portion of a base metal (shaped in a polygon including a rhombus) 2 made of any of materials including cemented carbide, ceramics, cermet, or sintered alloys. The sintered cubic boron nitride compact forms a cutting edge 4 of each cubic boron nitride cutting tool 1. The reference symbol 5 denotes a rake face formed in the edge tip 3 and the reference symbol 6 denotes a flank face.

The edge tip 3 is made of a sintered cubic boron nitride compact including cubic boron nitride particles having an average particle diameter within the range of 0.5 µm to 2 µm and having a thermal conductivity within the range of 20 to 70 W/m·K determined by adjusting the content of the cubic boron nitride particles.

Determining the average particle diameter of the cubic boron nitride powder, serving as a material of the sintered cubic boron nitride compact, within the range of 0.5 µm to 2 µm and determining the thermal conductivity of the sintered cubic boron nitride compact containing the cubic boron nitride powder within the range of 20 to 70 W/m·K enable both the formation of a positive rake angle, described below, and prevention of chipping and wear of a lateral cutting edge portion.

The tool illustrated in FIG. 2 includes such edge tips 3 at all the corner portions. Such edge tips 3 do not necessarily have to be provided at all the corner portions. An edge tip may be provided at one corner portion, as in the case of the tool illustrated in FIG. 1, or edge tips may be provided at two acute diagonal corner portions in the case of a rhombus cutting insert.

The edge tip of a sintered cubic boron nitride compact is manufactured in the method described below. The method is described, for example, in PTL 1 cited above.

The edge tip of a sintered cubic boron nitride compact is manufactured in the following steps. Firstly, WC powder, Co powder, and Al powder, which have fine particle diameters, are mixed together at a mass ratio of WC:Co:Al=25:68:7. The mixture is thermally treated at 1000° C. for 30 minutes under vacuum to form a compound and the compound is ground to obtain material powder constituting a binder phase.

Subsequently, a mixture of Al powder and Zr powder, which also have fine particle diameters, are thermally treated at 1000° C. for 30 minutes in an atmosphere of nitrogen to obtain a first compound. The first compound is then roughly ground. Thereafter, using a zirconia medium having a diameter smaller than 1 mm, the roughly ground first compound and the medium are finely ground in an ethanol solvent and then the medium is removed from the resultant to obtain a material powder constituting a heat-insulating phase.

Subsequently, the obtained material powder constituting the binder phase, the obtained material powder constituting the heat-insulating phase, and cubic boron nitride powder having an average particle diameter within the range of 0.5 µm to 2 µm are combined and mixed so that the cubic boron nitride content of the mixture has a desired volume % after sintering and the mixture is dried. The mixed powder is then stacked on a metal support plate, filled in a Mo capsule, and then sintered by an ultra-high pressure generator under the conditions, for example, at 7 GPa at the temperature of 1750° C. for 30 minutes.

Thus, a sintered cubic boron nitride compact is obtained. The sintered cubic boron nitride compact is cut into a predetermined shape and joined to a base metal to obtain a blank for a tool. Thereafter, some portions of the resultant are ground as necessary to form a tool having a predetermined shape.

Figure 4:
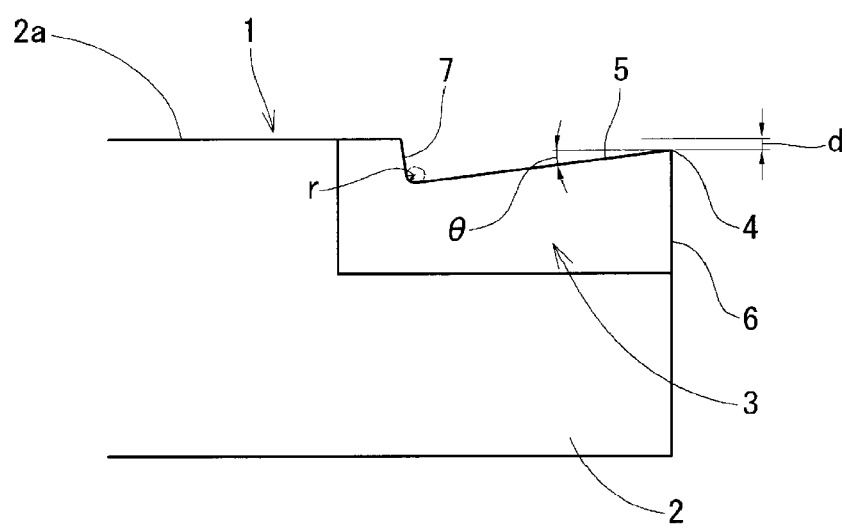
FIG. 4 is a cross-sectional view of the corner portion taken along the bisector CL of the corner angle illustrated in FIG. 3.
Figure 5:
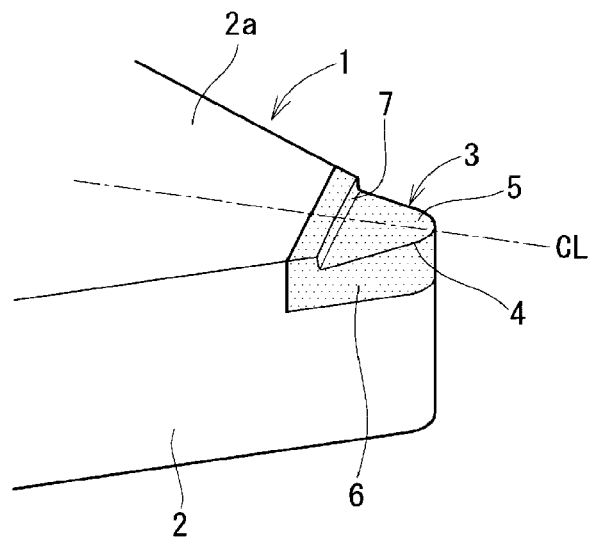
FIG. 5 is a perspective view of an enlarged edge portion.

Grinding is performed on at least a rake face 5 and a flank face 6 formed on the edge tip 3. When the rake face 5 is ground, the cutting edge 4 is provided with a positive rake angle. The rake angle $\theta$ illustrated in FIG. 4 is formed so as to have a positive degree within the range of 2° to 20°, more preferably, within the range of 5° to 15°.

Figure 3:
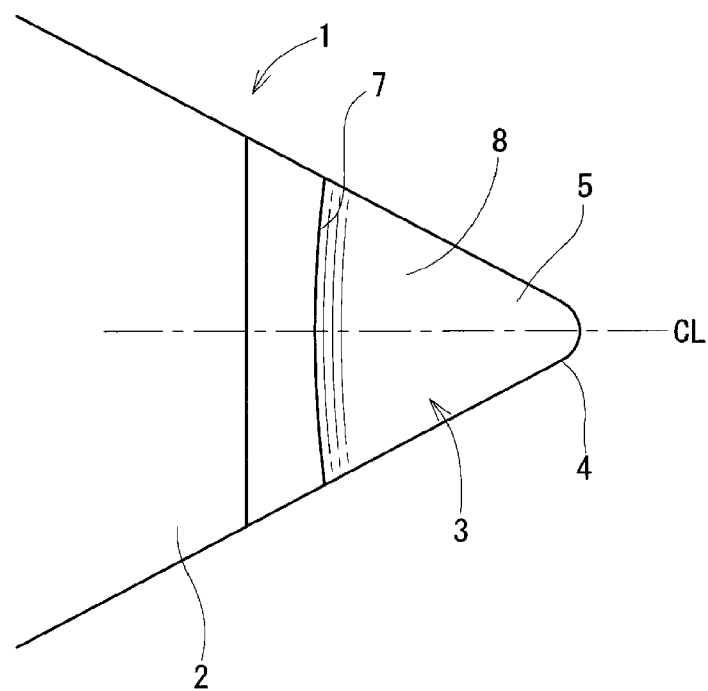
FIG. 3 is an enlarged plan view of a corner portion of the cubic boron nitride cutting tool illustrated in FIG. 1 at which the edge tip is disposed.

The rake angle $\theta$ is an angle measured at the foremost end (edge) of the cutting edge. FIG. 4 is a cross section of the corner portion taken along the bisector CL of a corner angle in the plan view of FIG. 3. In FIG. 3, the position at which the bisector CL of the corner angle crosses the cutting edge 4 is the foremost end of the cutting edge.

The reason why the rake angle $\theta$ is restricted to the above-described range is because the results of an evaluation test have revealed that the rake angle $\theta$ within the range of 5° to 15° has exerted a particularly high wear resistant effect although the rake angle $\theta$ within the range of 2° to 5° or 15° to 20° has exerted a certain wear resistant effect.

Figure 6:
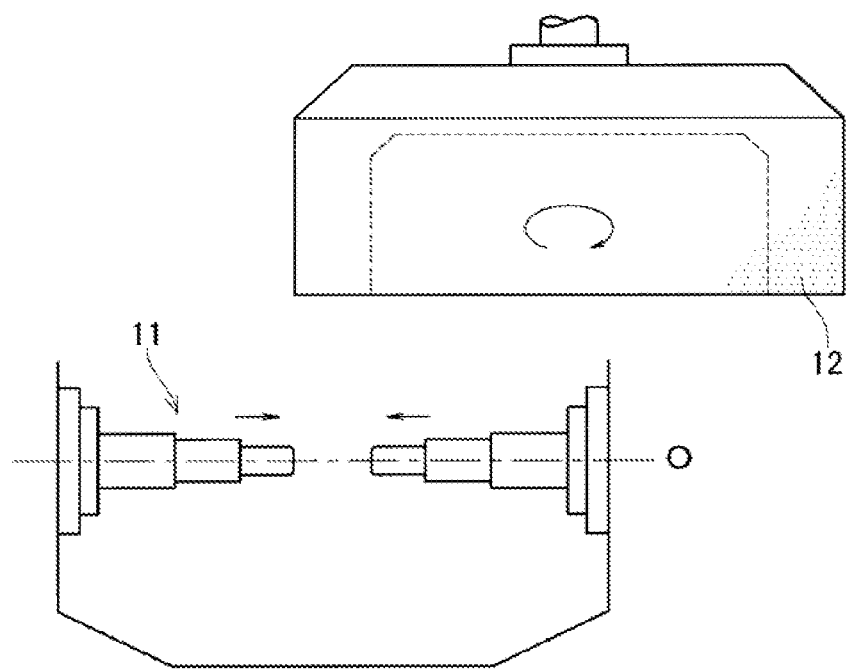
FIG. 6 is a plan view of a main portion of an example of a grinding machine used for manufacturing the tool according to the present invention.

Desired portions of a tool are ground using a NC grinding machine for manufacturing the tool. A grinding machine used for manufacturing the tool includes a chuck 11, which is illustrated in FIG. 6 and whose position and orientation is numerically controlled, and a grinding wheel (a cup grinding wheel is illustrated) 12 that rotates at a fixed position.

A workpiece (cubic boron nitride cutting tool) is carried to or from the grinding machine and handed to or from the chuck 11 by a robot hand (not illustrated) whose position is controlled.

Figure 7:
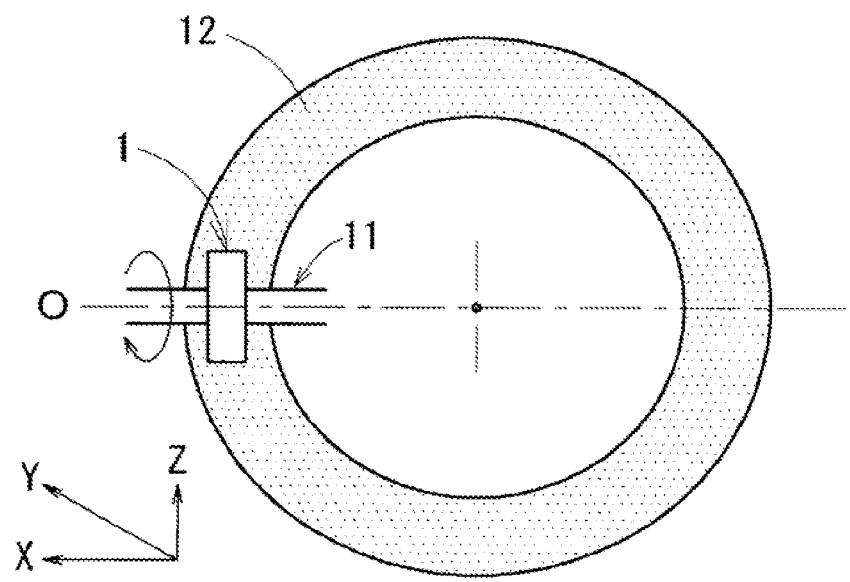
FIG. 7 is a front view illustrating the movement of a chuck of the grinding machine.
Figure 8:
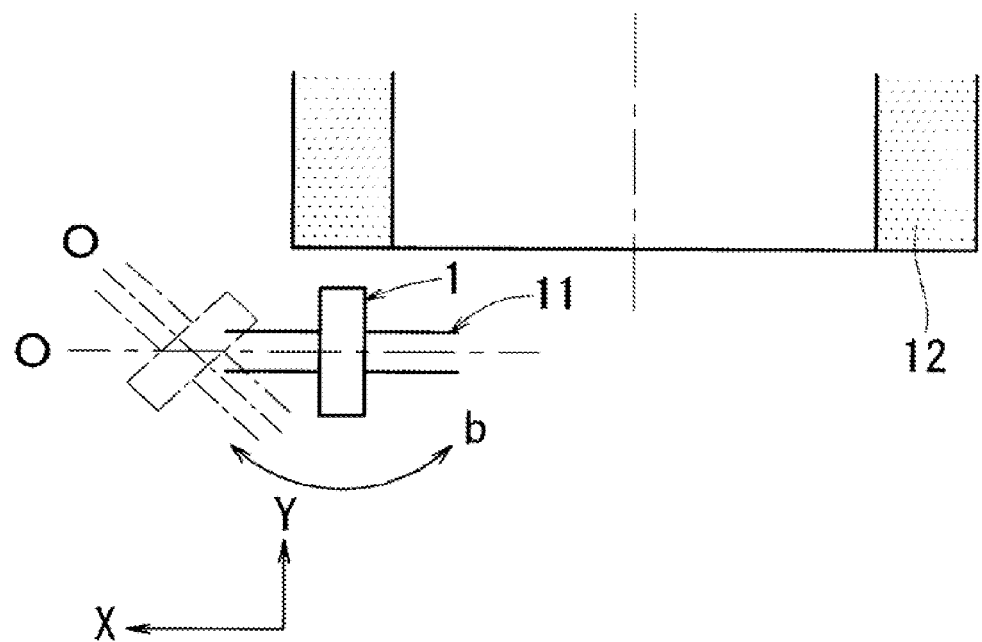
FIG. 8 is a plan view illustrating the movement of the chuck of the grinding machine.

The grinding machine used for grinding a tool according to the present invention functions under a four-axis control as illustrated in FIG. 7 and FIG. 8, that is, the grinding machine has functions with which to move the chuck in the X axis and Y axis directions, with which to rotate the chuck 11 around the axial center O of the chuck 11, and with which to rotate the chuck 11 in the b axis direction illustrated in FIG. 8 (not to move the chuck 11 in the Z axis direction). These functions of the grinding machine enable grinding of the flank face, the rake face, and a rising surface, described below, with one continuous movement of the chuck without having to regrip the tool.

Figure 9:
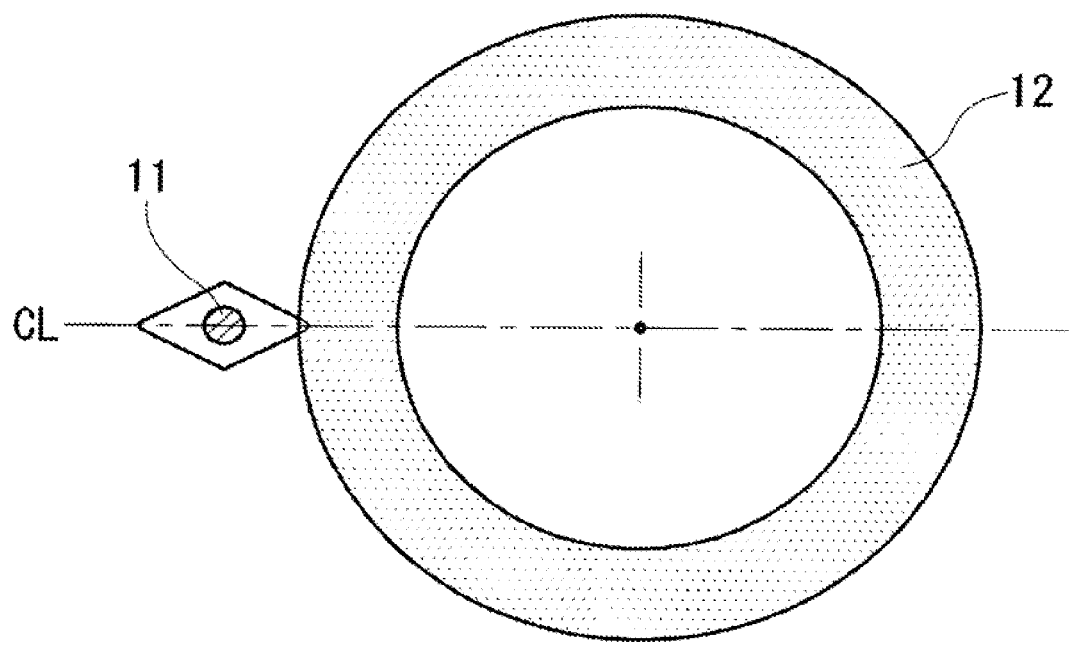
FIG. 9 illustrates the state of grinding the rake face.

The rake face 5 is ground while the chuck 11 holding the cubic boron nitride cutting tool 1 is rotated in a desired direction and the rake face of the edge tip 3 is pressed against the end surface of the grinding wheel 12 so as to be parallel to the surface, as illustrated in FIG. 9.

At this time, the edge tip 3 is ground so as to be slightly inclined with respect to the end surface of the grinding wheel 12, so that the rake face 5 can be provided with a positive rake angle.

In this invention, a positive rake angle is provided to a lathe tool for a heat-resistant alloy.

It has been common for a cutting tool made of a material having a high toughness, such as cemented carbide or high speed steel, to be provided with a positive rake angle at its cutting edge.

However, it has not been common for a cubic boron nitride cutting tool used for lathe turning of a heat-resistant alloy to have a positive rake angle.

The first reason for this is that it has been regarded as important for a cutting edge made of a sintered cubic boron nitride compact to have a high chipping resistance when used for the purpose of heat-resistant alloy cutting.

The second reason is that a positive rake angle causes a decrease in edge temperature in accordance with the enhancement of the sharpness.

Specifically, the decrease in edge temperature is unintended for the cutting method, involving selection of a sintered cubic boron nitride compact having a low thermal conductivity as a cutter for cutting a heat-resistant alloy and cutting of a workpiece while softening the workpiece with cutting heat occurring in accordance with an increase in edge temperature caused by an increase in cutting speed, and the decrease in edge temperature has been thought to reduce the effect of preventing chipping of the cutting edge.

There has been no finding that the life of a cutting tool can be prolonged by forming a positive rake angle in a cubic boron nitride cutting tool used for cutting a heat-resistant alloy. The inventors have coincidently found the effect after repeating various tests and seeking for the way to prolong the life of the tool.

The rake face 5 having a flat surface is preferable because such a rake face has a high workability. When the rake face 5 provided with a positive rake angle is formed, a step is formed between the surface lowered by being ground and an unground surface.

It is preferable that the portion at which the step is formed be formed into a rising surface 7, which is curved when the tool is viewed in a plan, and the rising surface 7 is continuous with the terminal end of the rake face 5 (end farther from the cutting edge).

The curved rising surface 7 can be processed using a side surface of the grinding wheel 12. The grinding wheel 12 preferably has a radius within the range of approximately 50 mm to 200 mm. The rising surface 7 ground using a side surface of such a grinding wheel is formed into a curved rising surface having a radius of curvature R of 50 mm to 200 mm. In addition, an inscribed circle interior to a corner portion at which the rising surface 7 is connected with the terminal end of the rake face 5, has a radius r within the range of approximately 5 μm to 50 μm, whereby curling of chips is facilitated.

Grinding of the rake face 5 lowers, to a certain degree, the foremost end (edge) of the cutting edge 4 toward the bottom surface of the base metal with respect to the line extended from a flat upper surface 2a of the base metal 2 (the same level as the upper surface 2a) in a cross section taken along the bisector CL of the corner angle as illustrated in FIG. 4. The degree d of axial lowering (the amount by which the edge is lowered with respect to the line extended from the upper surface 2a) preferably falls within the range of 10 μm to 100 μm.

The lower limit of the degree d of axial lowering is limited to 10 μm so that a sharp cutting edge can be formed after grinding the rake face.

On the other hand, as the degree d of axial lowering increases, an extra amount by which the rake face is unnecessarily ground increases. In addition, as the degree d of axial lowering increases, the cutting resistance also increases. With these increases taken into consideration, an allowable upper limit of the degree d of axial lowering is approximately 100 μm.

The cutting edge 4 lowers to a larger degree with respect to the line extended from the upper surface of the base metal with increasing distance from the foremost end (edge). Because of this, the rake angle at each portion of the cutting edge at the back of the foremost end (rake angle that appears in a cross section taken along the line perpendicular to each portion of the cutting edge in a plan view) is smaller than the rake angle at the foremost end; when, for example, the rake angle at the foremost end illustrated in FIG. 4 is 10°, the rake angle at each portion of the cutting edge at the back of the foremost end is 7° or 8°.

Desirably, the cutting edge 4 has a higher strength at a position away from the main portion (edge) than at the edge. Making the rake face flat can also satisfy such a demand.

By grinding the rake face 5 with the method illustrated in FIG. 9, ground streaks 8 substantially perpendicular to the bisector CL of the corner angle when the tool is viewed in a plan are formed on the rake face 5 as illustrated in FIG. 3. The ground streaks 8 extending in that direction are effective in preventing chips from adhesion on the rake face 5. Strictly speaking, the ground streaks 8 are curved at the radius of curvature approximate to the outer diameter of the grinding wheel 12. Thus, the ground streaks 8 are described as being substantially perpendicular to the bisector CL herein.

The cubic boron nitride cutting tool according to the present invention forms a sharp cutting edge by forming a positive rake angle. Since such a sharp cutting edge is easily chipped, it is preferable for the cutting edge to be subjected to a fine R honing for toughening the edge, as necessary.

The R honing is preferably performed so as not to weaken the effect produced by making the rake angle positive (that is, enhancing the sharpness). The R honing at the radius of curvature within the range of 0.005 mm to 0.02 mm can satisfy this demand.

EXAMPLE

Cubic boron nitride cutting tools having specifications illustrated in Table I were prototyped and their performances were evaluated. The prototyped tools have the shape as illustrated in FIG. 1. Table I also shows the thermal conductivity of the edge tip and the positive rake angle at the cutting edge of the edge tip of each of sample Nos. 1 to 10. Table II shows the composition of the edge tip of each sample shown in Table I.

For the sintered cubic boron nitride compacts forming the edge tips, cubic boron nitride particles having an average particle diameter of 1 μm have been used. However, cubic boron nitride particles having average particle diameter within the range of 0.5 μm to 2 μm can form sintered cubic boron nitride compacts that negligibly have a big difference in performance.

The sample Nos. 1 to 3 and Nos. 7 to 10 satisfy the specifications according to the present invention in terms of both the thermal conductivity of the edge tip made of a sintered cubic boron nitride compact and the degree of the positive rake angle. The sample Nos. 4 to 6 are out of the specifications according to the present invention in terms of the thermal conductivity of the edge tip.

The thermal conductivity of the edge tip differed between the sample Nos. 1 to 4 and Nos. 7 to 10 by adjusting the cubic boron nitride content. Commercially available Borazon (the product name from Diamond Innovations) was used as the edge tip of the sample No. 5. A commercially available β-SiAlON ceramic tool was used as the sample No. 6.

Using these prototyped tools, workpieces, which are Inconel 718 bars having a hardness of HRC 46, a diameter of 120 mm, and a length of 250 mm, were cut under the following conditions:

Cutting Conditions
Cutting Speed V: 200 m/min
Feed f: 0.1 mm/rev
Depth of Cut ap: 0.3 mm
Coolant: 20-fold dilution of emulsion.

In the evaluation test, the life of the tool was determined at the arrival of either VN or VB at 0.2 mm and the length of cut up to the end of its life was examined. The results are shown also in Table I.

TABLE I

| Sample No. | Thermal Conductivity of Edge Tip (W/m·K) | Rake Angle (°) | Arrival at Cutting Length of 500 m | | Lifetime Cut Length (km) | Life Determining Factor |
|---|---|---|---|---|---|---|
| | | | VN (mm) | VB (mm) | | |
| 1 | 20 | 10 | 0 | 0.093 | 1.58 | VB |
| 2 | 50 | 10 | 0 | 0.076 | 1.95 | VB |
| 3 | 70 | 10 | 0.063 | 0.073 | 1.55 | VN |
| 4 | 10 | 10 | 0 | 0.134 | 0.87 | VB |
| 5 | 100 | 10 | 0.138 | 0.064 | 0.77 | VN |
| 6 | 15 | 10 | Broken | Broken | Unable to Measure due to Initial Chipping | |
| 7 | 50 | 2 | 0.085 | 0.067 | 1.22 | VN |
| 8 | 50 | 5 | 0 | 0.079 | 1.91 | VB |
| 9 | 50 | 15 | 0 | 0.074 | 1.89 | VB |
| 10 | 50 | 20 | 0.070 | 0.063 | 1.40 | VN |

TABLE II

| | Composition of Edge Tip | |
|---|---|---|
| Sample No. | Cubic Boron Nitride Content (vol %) | Binder Phase Component |
| 1 | 63 | WC—Co—Al |
| 2 | 78 | WC—Co—Al |
| 3 | 83 | WC—Co—Al |
| 4 | 53 | WC—Co—Al |
| 5 | 88 | WC—Co—Al |
| 6 | — | — |
| 7 | 78 | WC—Co—Al |
| 8 | 78 | WC—Co—Al |
| 9 | 78 | WC—Co—Al |
| 10 | 78 | WC—Co—Al |

As is clear from this test results, the cutting tools having the thermal conductivity of the edge tip made of a sintered cubic boron nitride compact within the range of 20 to 70 W/m·K have prolonged their lives to a larger extent than the sample No. 4 whose thermal conductivity is 10 W/m·K or the sample No. 5 whose thermal conductivity is 100 W/m·K. The life prolonging effect particularly significantly appears in the samples having a positive rake angle within the range of 5° to 15°.

Cutting tools to which this invention is applied may have any shape, such as a rhombus, a triangle, a square, or a polygon having five or more corners. In addition, the present invention is applicable to all the cutting tools having an edge tip made of a sintered cubic boron nitride compact at at least one corner portion of a base metal.

REFERENCE SIGNS LIST 1 cubic boron nitride cutting tool
2 base metal
2a flat upper surface
3 edge tip
4 cutting edge
5 rake face
6 flank face
7 rising surface
8 ground streak
θ rake angle
CL bisector of corner angle
d amount by which foremost end of cutting edge is lowered with respect to line extended from base metal upper surface 11 chuck
12 grinding wheel
O axis of chuck

The invention claimed is:

1. A cubic boron nitride cutting tool, comprising:
an edge tip made of a sintered cubic boron nitride compact including cubic boron nitride particles; and
a base metal that holds the edge tip at a corner portion of the base metal,
wherein:
a cutting edge formed on the edge tip of the tool has a positive rake angle; the edge tip has a rake face, a rising surface, and a top surface;
in a cross section taken along a bisector of a corner angle of the corner portion;
a first end of the rising surface is connected with the top surface and a second end of the rising surface is connected with the rake face; and
in a top view, (i) the rake face has grinding lines having a concave curve that faces the corner portion of the tool, and (ii) the grinding lines are parallel to the rising surface.

2. The cubic boron nitride cutting tool according to claim 1, wherein a degree of the positive rake angle is within the range of 5° to 15°.

3. The cubic boron nitride cutting tool according to claim 1, wherein, in a cross section taken along a bisector of a corner angle of the corner portion, a foremost end of the cutting edge is lowered by 10 μm to 100 μm toward a bottom surface of the base metal with respect to a line extended from a flat upper surface of the base metal and thus the cutting edge is lowered to a larger extent with increasing distance from the foremost end.

4. The cubic boron nitride cutting tool according to claim 3, wherein a flat rake face is formed in the edge tip.

5. The cubic boron nitride cutting tool according to claim 1, wherein a rising surface curved at a radius of curvature R of 50 mm to 200 mm is continuous with a terminal end of a rake face of the edge tip forming the positive rake angle.

6. The cubic boron nitride cutting tool according to claim 1, wherein the sintered cubic boron nitride compact has a thermal conductivity within the range of 20 to 70 W/m·K.

7. The cubic boron nitride cutting tool according to claim 1, wherein the cubic boron nitride particles have an average particle diameter within the range of 0.5 μm to 2 μm.

\* \* \* \* \*